(12) United States Patent
Sharma et al.

(10) Patent No.: US 10,809,217 B2
(45) Date of Patent: Oct. 20, 2020

(54) CORROSION DETECTION SYSTEM

(71) Applicant: CORROSION RADAR LTD, Cambridge (GB)

(72) Inventors: Prafull Sharma, Cranfield (GB); Hoi Yeung, Cranfield (GB)

(73) Assignee: CRANFIELD UNIVERSITY, Cranfield, Bedfordshire (GB)

(*) Notice: Subject to any disclaimer, the term of this patent is extended or adjusted under 35 U.S.C. 154(b) by 133 days.

(21) Appl. No.: 16/073,658

(22) PCT Filed: Jan. 26, 2017

(86) PCT No.: PCT/GB2017/050203
§ 371 (c)(1),
(2) Date: Jul. 27, 2018

(87) PCT Pub. No.: WO2017/129983
PCT Pub. Date: Aug. 3, 2017

(65) Prior Publication Data
US 2019/0064096 A1 Feb. 28, 2019

(30) Foreign Application Priority Data
Jan. 28, 2016 (GB) .................................. 1601609.9

(51) Int. Cl.
G01N 27/20 (2006.01)
G01N 17/00 (2006.01)

(52) U.S. Cl.
CPC ........... *G01N 27/20* (2013.01); *G01N 17/006* (2013.01)

(58) Field of Classification Search
CPC ............................ G01N 27/20; G01N 17/006
(Continued)

(56) References Cited

U.S. PATENT DOCUMENTS 4,564,489 A * 1/1986 Welzen ................. F27D 5/0012
                                                          264/607
4,611,169 A * 9/1986 Hermann ............... G01V 3/108
                                                          104/284
(Continued)

FOREIGN PATENT DOCUMENTS

CA       2059100 A1      7/1992
CN       1595616 A       3/2005
(Continued)

OTHER PUBLICATIONS

Galbraith, J. M., et al., "A New Inspection Technology for Detecting Corrosion Under Insulation," Corrosion 2000, Paper No. 00101, NACE International, 2000, 5 pages.
(Continued)

*Primary Examiner* — Giovanni Astacio-Oquendo
(74) *Attorney, Agent, or Firm* — Withrow & Terranova, P.L.L.C.; Vincent K. Gustafson

(57) ABSTRACT

A system (1) for detecting and locating corrosion on the outer surface of a metal body (2). The system includes an extended electromagnetic waveguide (6) arranged adjacent to the outer surface of the metal body. The electromagnetic waveguide includes a sacrificial component that experiences substantially the same environment as the outer surface of the metal body. The system also includes a waveform generator (10) arranged to be connected to the waveguide and to inject an electromagnetic waveform into the waveguide. The system also includes a waveform analyser (12) connected to the waveguide. The waveform analyser is arranged to receive a reflected portion of the injected electromagnetic waveform from the waveguide. The reflected portion of the injected electromagnetic waveform is used by the waveform analyser to determine the location of corrosion of the sacrificial component of the waveguide.

19 Claims, 4 Drawing Sheets

(58) Field of Classification Search
USPC .............. 324/346, 333, 334, 338, 339, 700
See application file for complete search history.

(56) References Cited

U.S. PATENT DOCUMENTS

| | | | |
|---|---|---|---|
| 5,036,287 | A | 6/1991 | Serwatzky |
| 5,255,059 | A * | 10/1993 | Kai .................... G03G 15/0921 |
| | | | 399/265 |
| 6,114,857 | A | 9/2000 | Kohl |
| 6,505,650 | B2 | 1/2003 | Bohon et al. |
| 8,490,472 | B2 | 7/2013 | Strong |
| 8,596,861 | B2 | 12/2013 | Kane et al. |
| 8,810,264 | B2 | 8/2014 | Bohon et al. |
| 2008/0204275 | A1 | 8/2008 | Wavering et al. |
| 2009/0287426 | A1 | 11/2009 | Kukowski |
| 2010/0171483 | A1 | 7/2010 | Frost et al. |
| 2010/0224913 | A1 * | 9/2010 | Chiang .................. G01N 17/04 |
| | | | 257/253 |
| 2011/0175633 | A1 * | 7/2011 | Dobashi .............. G01M 5/0025 |
| | | | 324/700 |
| 2011/0205532 | A1 | 8/2011 | Mori et al. |
| 2012/0247975 | A1 | 10/2012 | Tewari et al. |
| 2012/0265450 | A1 | 10/2012 | Suetsugu et al. |
| 2013/0224867 | A1 | 8/2013 | Lorenz et al. |
| 2013/0304438 | A1 | 11/2013 | Bailey et al. |
| 2014/0251792 | A1 | 9/2014 | Funahashi |
| 2016/0091413 | A1 * | 3/2016 | Kim ....................... G01N 17/02 |
| | | | 29/428 |

FOREIGN PATENT DOCUMENTS

| | | |
|---|---|---|
| CN | 201173985 Y | 12/2008 |
| CN | 101943644 A | 1/2011 |
| CN | 102016524 A | 4/2011 |
| CN | 102507429 A | 6/2012 |
| CN | 103487363 A | 1/2014 |
| CN | 203572757 U | 4/2014 |
| JP | 2012052933 A | 3/2012 |
| JP | 2012208088 A | 10/2012 |
| JP | 2012247253 A | 12/2012 |
| NL | 1015354 A1 | 12/2000 |
| WO | 9854562 A1 | 12/1998 |
| WO | 0054028 A1 | 9/2000 |

OTHER PUBLICATIONS

Jones, R. E., et al., "Use of Microwaves for the Detection of Water as a Cause of Corrosion Under Insulation," Journal of Nondestructive Evaluation, vol. 31, No. 1, Nov. 29, 2011, pp. 65-76.

Liu, W., et al., "An Overview of Corrosion Damage Detection in Steel Bridge Strands Using TDR," Proceedings of the Second International Symposium and Workshop on Time Domain Reflectometry for Innovative Geotechnical Applications, Evanston, Illinois, USA, Sep. 5-7, 2001, 9 pages.

Minutes of EFC WP 15, "Corrosion in the Refinery Industry," Eni Technologie Research Centre, Available online at: <<http://efcweb.org/efcweb_media/Minutes4a_WP15-p-106.html>>, San Donato Milanese Italy, Mar. 8-9, 2004, 10 pages.

Search Report under Section 17(5) for United Kingdom Patent Application No. GB1601609.9, dated May 17, 2016, 3 pages.

International Search Report and Written Opinion for International Patent Application No. PCT/GB2017/050203, dated May 29, 2017, 16 pages.

Bogorad et al., "Corrosion and Protection of Seagoing Vessels," pp. 184-187, National Defense Industrial Press, 1983.

First Office Action for Chinese Patent Application No. 201780008183.3 dated Jul. 15, 2020, 44 pages including English translation.

* cited by examiner

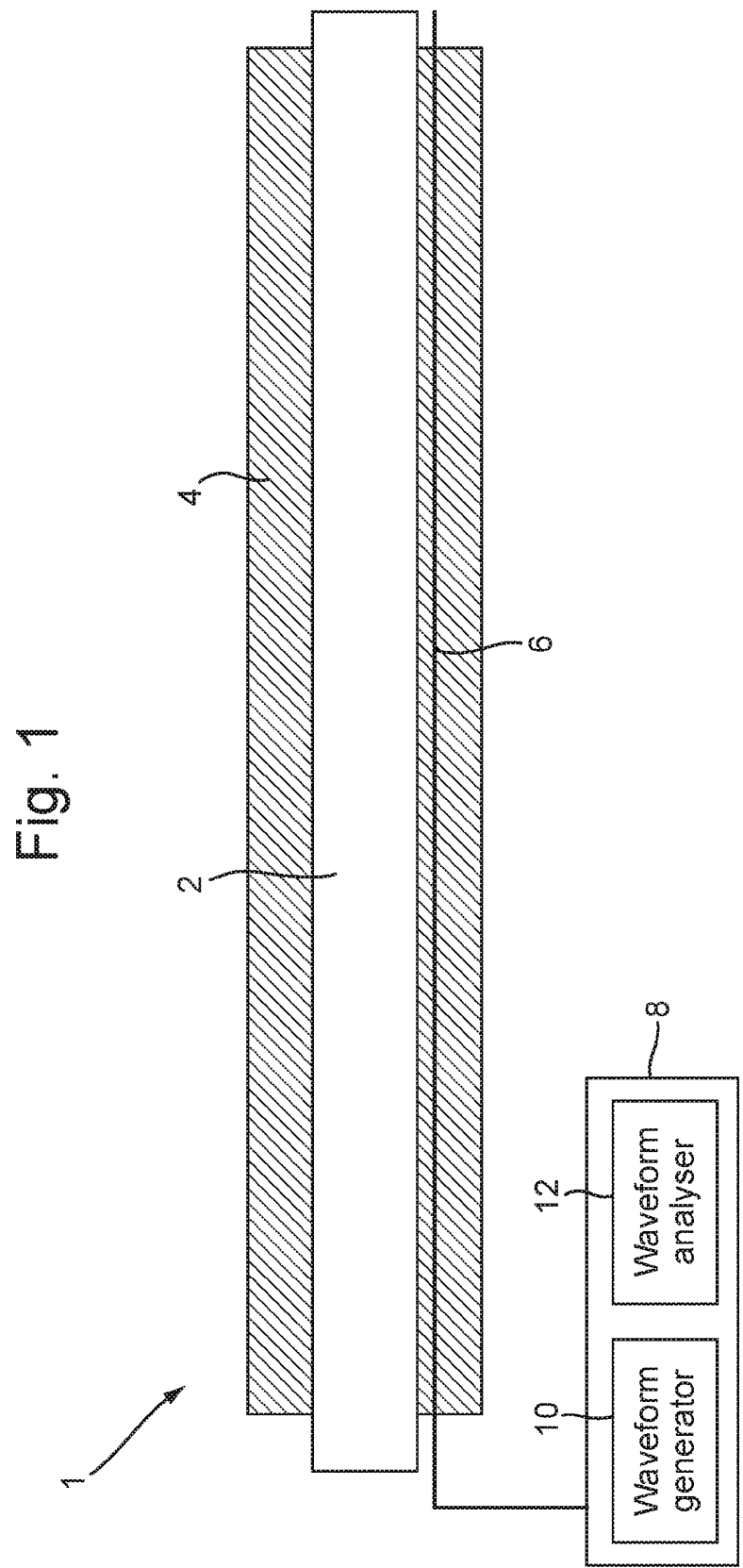

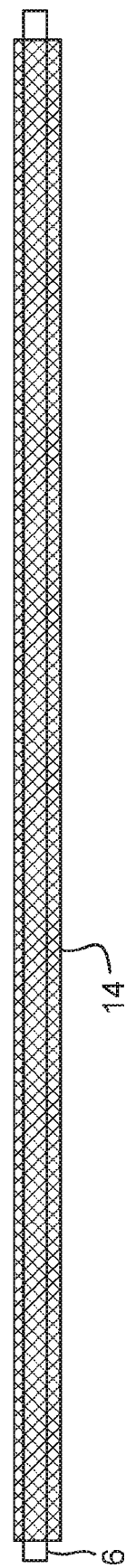

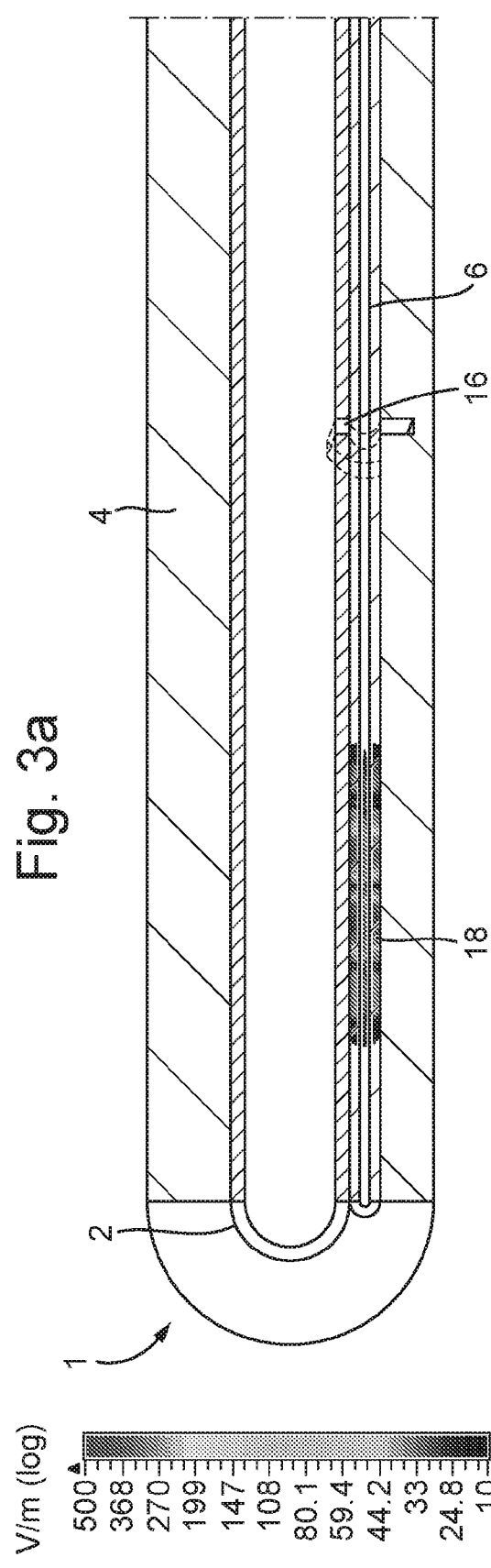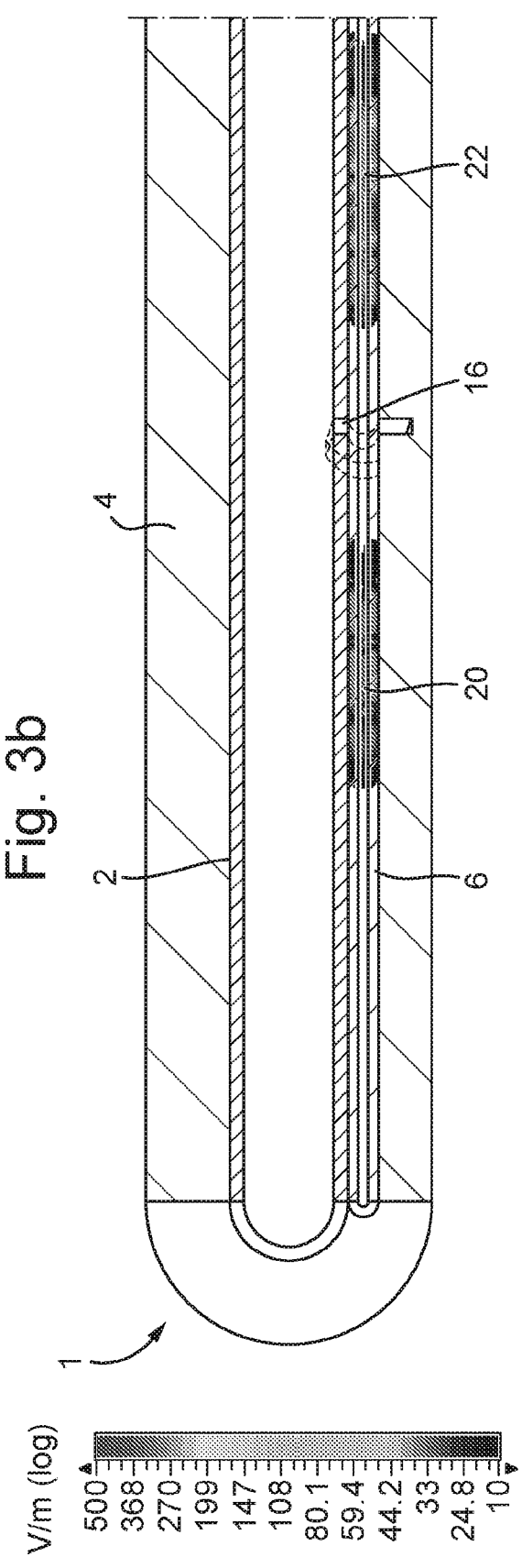

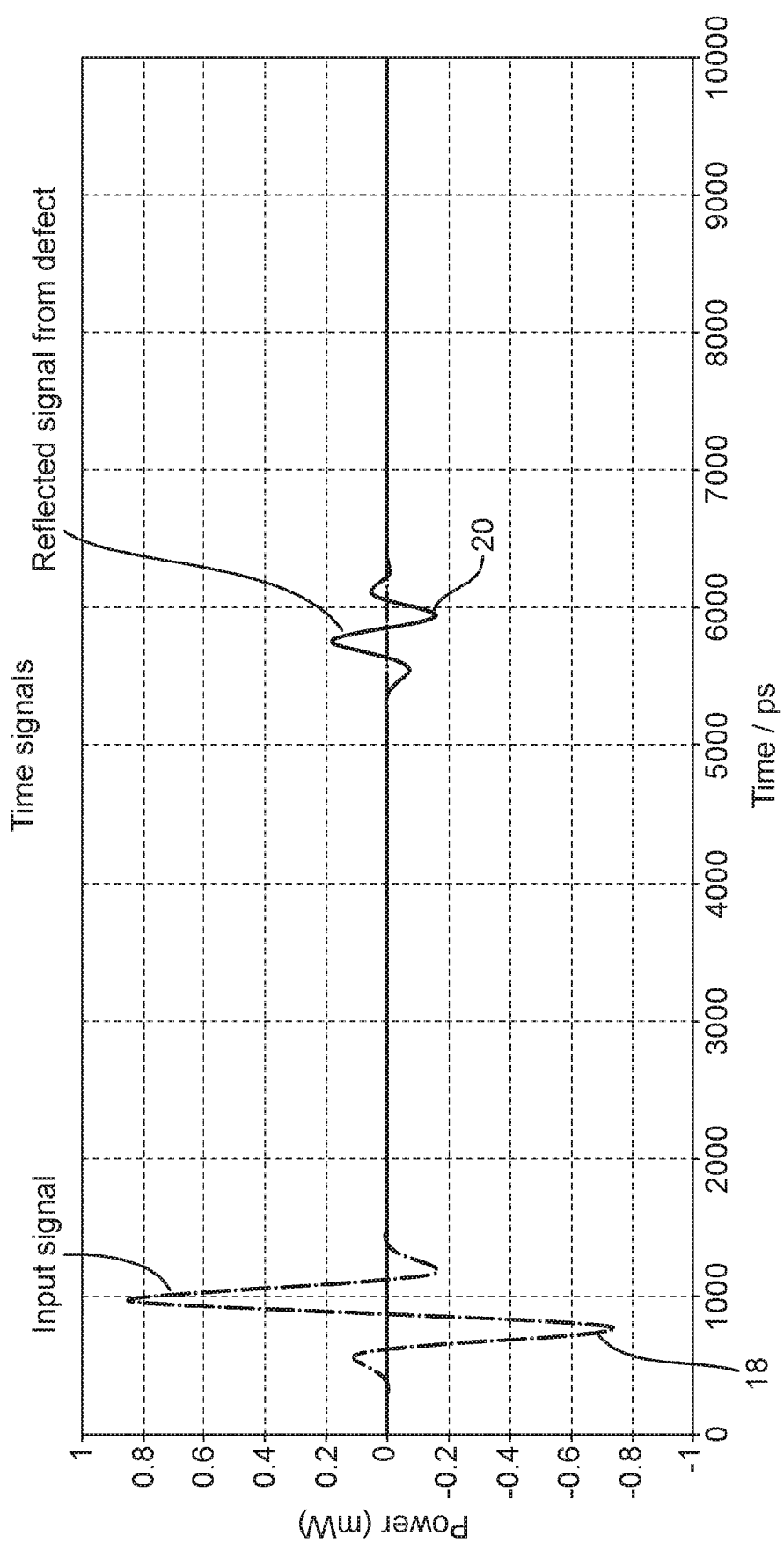

CORROSION DETECTION SYSTEM

This application is a 35 U.S.C. § 371 national phase filing of International Application No. PCT/GB2017/050203 filed on Jan. 26, 2017, and claims the benefit of United Kingdom Patent Application No. 1601609.9 filed on Jan. 28, 2016, wherein the disclosures of the foregoing applications are hereby incorporated by reference herein in their respective entireties.

This invention relates to a system for detecting and locating corrosion, in particular a system for detecting and locating the corrosion of pipes and other bodies under insulation.

There are many installations, e.g. in the oil and gas, petrochemical, and pharmaceutical industries, that contain hundreds, if not thousands, of kilometres of metal pipework. Such metal pipes are typically wrapped in an insulation jacket to insulate the pipe. Metal pipes in these installations are particularly susceptible to corrosion on their external surface owing to exposure to water and chlorides, particularly for coastal and offshore installations, with the corrosion often being accelerated by the elevated operation temperatures and temperature cycling owing to the fluid flowing through the pipes, for example.

Although an insulation jacket helps to protect a pipe from the ingress of water and chlorides, it is difficult to maintain the pipe in a completely sealed environment and so it is inevitable that corrosion will occur. However the nature and location of this corrosion is erratic and thus difficult to protect. Furthermore, owing to the pipe being covered by the insulation jacket, the corrosion is difficult to detect. For example, visual inspections require the insulation jacket to be removed, which, for an installation having many kilometres of pipeline, is a costly, logistically difficult and time intensive task. Once any corrosion has started, it spreads quickly such that once it has been found, e.g. during a regular visual inspection, it is often too late to instigate any remedial action without having to go to the length of replacing entire sections of the pipe, that again is a difficult and costly task, which interrupts operation of the installation.

It will be appreciated that the consequences of a leak in such oil and gas installations has the potential to be disastrous, both environmentally, financially and for the reputation of the parties associated with the installation. Proactive inspection of the pipework to detect the early stages of corrosion is therefore essential, but visual inspections can be prohibitively expensive (e.g. millions of dollars per annum per oil and gas refinery) owing to the large scale of the pipework, much of which is often inaccessible and thus may require large scale complex scaffolding to reach and inspect.

It is therefore desired to have a corrosion detection and location technique that is able to detect and locate the corrosion of a pipe without having to perform a visual inspection (and thus obviating the logistical and financial challenges outlined above). The scanning of sections of pipe using, e.g. X-rays, neutron scattering or ultrasound may be implemented, but these techniques are difficult to implement, complex to interpret the results and are not easily scalable, e.g. they are only able to investigate a limited length of the pipe.

The aim of the present invention is to provide an improved corrosion detection and location system.

When viewed from a first aspect the invention provides a system for detecting and locating corrosion on the outer surface of a metal body, the system comprising:

an extended electromagnetic waveguide arranged adjacent to the outer surface of the metal body, the electromagnetic waveguide comprising a sacrificial component that experiences substantially the same environment as the outer surface of the metal body;

a waveform generator arranged to be connected to the waveguide and to inject an electromagnetic waveform into the waveguide; and a waveform analyser connected to the waveguide and arranged to receive a reflected portion of the injected electromagnetic waveform from the waveguide and to use the reflected portion of the injected electromagnetic waveform to determine the location of corrosion of the sacrificial component of the waveguide.

When viewed from a second aspect the invention provides a method of detecting and locating corrosion on the outer surface of a metal body, the method comprising:

injecting an electromagnetic waveform into an electromagnetic waveguide that is arranged adjacent to the outer surface of the metal body, the electromagnetic waveguide comprising a sacrificial component that experiences substantially the same environment as the outer surface of the metal body;

receiving a reflected portion of the injected electromagnetic waveform from the waveguide; and using the reflected portion of the injected electromagnetic waveform to determine the location of corrosion of the sacrificial component of the waveguide.

The present invention therefore provides a corrosion detection and location system and a method of performing corrosion detection and location, that is able to detect the presence of and locate corrosion on the outer surface of a metal body. The system includes an extended electromagnetic waveguide which is arranged to lie adjacent to the outer surface of the metal body such that it experiences substantially the same environment as the outer surface of the metal body. The system also includes a waveform generator that is connected to the waveguide. The waveform generator is arranged to generate and inject an electromagnetic waveform into the waveguide, with the extended waveguide being arranged to carry the injected (and reflected portion(s) of the) waveform.

The system further includes a waveform analyser that is connected to the waveguide. The waveform analyser is arranged to receive a reflected portion of the injected electromagnetic waveform from the waveguide, e.g. owing to corrosion of the sacrificial component of the waveguide which changes the impedance of the waveguide at the location of the corrosion. The waveform analyser is then arranged to use the reflected portion of the injected electromagnetic waveform to detect the presence, and to determine the location, of any corrosion of the sacrificial component of the waveguide, using the portion of the injected electromagnetic waveform that has been reflected from one or more points in the waveguide and received by the waveform analyser.

Thus it will be appreciated that the corrosion detection system of the present invention, by providing an extended waveguide adjacent to the outer surface of a metal body, allows an in situ measurement of corrosion to be performed which may be monitored, and e.g. controlled, remotely. The sacrificial component of the waveguide, from being positioned adjacent to and in substantially the same environment as the outer surface of the metal body, experiences the same environmental conditions, e.g. exposure to water and chlorides. Thus the corrosion of the sacrificial component of the waveguide should correlate with the corrosion of the outer surface of the metal body.

The system and method of the present invention uses electromagnetic waveforms that are sent down the waveguide (generated and input by the waveform generator) to detect changes in impedance in the waveguide (by detecting and analysing the reflected waveform, with reflections being produced when there is a change in impedance of the waveguide). Corrosion of the sacrificial component of the waveguide is thus arranged to alter the impedance of the waveguide at the location of the corrosion to thus induce a reflection of the input waveform. Using the waveform analyser to use the reflection portion(s) of the injected electromagnetic waveform thus allows the location of the corrosion of the sacrificial component of the waveguide to be determined, e.g. by using the time delay between the input and reflected waveforms along with the speed of the wave calculated using the dielectric constant of the waveguide (i.e. distance=time/speed, where speed=c/√(dielectric constant) and c is the universal speed of light in a vacuum).

As the corrosion of the sacrificial component is likely to correlate with corrosion of the outer surface of the metal body, the location of the corrosion in the sacrificial component of the waveguide thus provides an indication that there may be corrosion of outer surface of the metal body at this location. This then allows for further investigation, e.g. a visual inspection, to be performed at this specific location and any remedial work to be undertaken.

It will thus be seen that with such a corrosion detection system installed in, for example, a pipework installation, the corrosion detection system can perform monitoring for possible corrosion of the outer surface of the metal body which thus obviates the need for speculative visual inspections to be performed. The corrosion detection system of the present invention thus has the potential to drastically improve the detection of the corrosion of the outer surface of metal bodies, as well as simplifying and reducing the cost of such work.

The metal body, for which the outer surface is being monitored for corrosion by the adjacent waveguide, may comprise any suitable and desired metal body, i.e. that has a metal outer surface. The metal body may comprise a container, e.g. a tank, or at least a wall thereof. In a preferred embodiment the metal body comprises a metal pipe. Preferably the metal pipe is arranged in an oil and/or gas installation, and thus preferably is arranged to carry oil and/or gas.

The metal body, e.g. metal pipe, may not be covered. For example, the pipe may be buried underground or located beneath the sea, e.g. on the sea floor. However preferably the outer surface of the metal body, e.g. metal pipe, is covered (e.g. wrapped) in a layer of insulation, e.g. an insulation jacket. Such insulation jackets protect the (metal) outer surface of the metal body from its external environment and thus from corrosion (though, as outlined above, such insulation is often not perfect).

When the outer surface of the metal body is covered in a layer of insulation, preferably the waveguide is arranged between the outer surface of the metal body and the layer of insulation or arranged to be embedded within the layer of insulation, such that the sacrificial component of the waveguide experiences substantially the same environment as the outer surface of the metal body.

Although the extended waveguide, which is arranged adjacent (e.g. in proximity) to the outer surface of the metal body, may come into contact with the outer surface of the metal body, preferably the extended waveguide is arranged such that the sacrificial component of the waveguide does not contact the outer surface of the metal body, as this may induce corrosion between the sacrificial component of the waveguide and the outer surface of the metal body, e.g. owing to water collecting at this point or through galvanic corrosion. Thus preferably the sacrificial component of the waveguide is spaced from the outer surface of the metal body (while still remaining adjacent thereto such that it experiences substantially the same environment as the outer surface of the metal body). Preferably the sacrificial component of the waveguide is spaced from the outer surface of the metal body by less than 5 cm, e.g. less than 2 cm, e.g. less than 1 cm.

In one embodiment the system comprises a perforated layer, e.g. a sheath or sleeve, that is provided between the extended waveguide (and, e.g., particularly the sacrificial component thereof) and the outer layer of the metal body, e.g. surrounding the extended waveguide. Preferably the perforated layer comprises a dielectric (insulating) material. Providing a perforated layer between the (sacrificial component of the) extended waveguide and the outer surface of the helps to prevent the sacrificial component of the extended waveguide from coming into direct contact with the outer surface of the metal body and thus inducing corrosion between the sacrificial component and the outer surface of the metal body. Owing to the perforations in the perforated layer, the sacrificial component of the extended waveguide is still able to experience substantially the same environment as the outer surface of the metal body. In one embodiment the perforated layer comprises a plastic netting.

The extended waveguide may comprise any suitable and desired waveguide, e.g. over which an electromagnetic waveform may be injected and reflected. In a preferred embodiment the extended waveguide comprises a pair of extended conductors, wherein one of the pair of extended conductors comprises the sacrificial component and the other of the pair of extended conductors comprises a non-sacrificial component. Preferably the non-sacrificial component is arranged to be protected from the environment to which the sacrificial component is arranged to be exposed.

Such a twin conductor waveguide may help to allow the system to detect and locate multiple points of corrosion in the sacrificial component of the waveguide. This is because the non-sacrificial component is preferably arranged to carry a transmitted portion of the electromagnetic waveform in the electromagnetic waveguide beyond any point of corrosion in the sacrificial component. Thus the non-sacrificial component of the extended waveguide may help to allow a transmitted portion of the electromagnetic waveform to travel beyond an initial point of corrosion in the sacrificial component such that the system is able to detect and locate a further point of corrosion in the sacrificial component.

In a preferred embodiment the extended waveguide, e.g. a pair of extended conductors, comprises a transmission line. The waveguide, e.g. transmission line, may comprise a twisted pair or a parallel, e.g. coplanar, pair of wires (such as a pair formed on a, e.g. flexible, printed circuit board), with the sacrificial component comprising one of the wires in the pair. Such a pair of wires may also allow the presence of water, e.g. if this forms between the pair of wires, to be detected. In a preferred embodiment the extended waveguide comprises a coaxial waveguide, e.g. cable, with the sacrificial component comprising the outer conducting shield of the coaxial waveguide and, e.g., the core of the coaxial waveguide comprising the non-sacrificial component.

Preferably the waveguide is separate from the metal body, i.e. the metal body does not form part of the waveguide. Thus, as indicated above, the corrosion on the outer surface of the metal body is not detected directly, but is inferred from the corrosion that is detected in the sacrificial component of the extended waveguide.

Preferably the extended waveguide is flexible. This allows the waveguide to follow the contours of the outer surface of the metal body, e.g. the route of a (e.g. non-linear) pipe.

The sacrificial component of the extended waveguide may be formed in and of any suitable and desired shape, such that it is exposed to substantially the same environmental conditions as the outer surface of the metal body. Preferably the sacrificial component extends along substantially the whole length of the extended waveguide. Preferably the sacrificial component forms one of the conducting components of the extended waveguide, e.g. one of the wires in a pair or the outer conducting shield of a coaxial waveguide. Thus preferably the extended waveguide is arranged such that corrosion of the sacrificial component of the extended waveguide changes the impedance of the extended waveguide (i.e. at the location of the corrosion).

The waveguide (or at least the sacrificial component thereof) may comprise any suitable and desired material, e.g. such that it corrodes. For example the waveguide (or at least the sacrificial component thereof) may comprise aluminium, carbon steel and/or stainless steel (these latter two materials being commonly used to form metal pipes and other bodies). Thus the waveguide (or at least the sacrificial component thereof) may comprise the same material as the outer surface of the metal body, i.e. such that they corrode at a similar rate (in the same environment). This may thus allow a good indication to be given when corrosion in the sacrificial component of the waveguide is detected that corrosion of the outer surface of the metal body has occurred.

However in a preferred embodiment the waveguide (or at least the sacrificial component thereof) comprises a material that corrodes at a faster rate than (under exposure to the same environmental conditions as) the material forming the outer surface of the metal body, i.e. preferably the waveguide (or at least the sacrificial component thereof) is less corrosion resistant than the outer surface of the metal body. Providing an extended waveguide that is less corrosion resistant than the outer surface of the metal body allows a corrosion detection to be provided that is more sensitive to corrosion and thus can provide an early warning to the potential of corrosion of the metal body. This may allow preventative or remedial work to be carried out on the metal body while the pipe is intact, thus minimising the cost of such repairs.

In a preferred embodiment the sacrificial component of the extended waveguide comprises copper. This is particularly convenient when the extended waveguide comprises a coaxial waveguide and the sacrificial component comprises the outer conducting shield of the coaxial waveguide. When the extended waveguide comprises a coaxial waveguide preferably the inner conductor and the outer conducting shield comprise copper, with a dielectric (insulator) being provided therebetween.

In a preferred embodiment the correlation between the corrosion rate of the sacrificial component of the extended waveguide and of the outer surface of the metal body is known such that this correlation may be used, e.g. by the waveform analyser or a subsequent processor, to determine the amount of corrosion to the outer surface of the metal body from the amount of corrosion determined for the sacrificial component of the extended waveguide. Preferably the (mathematical) relationship, i.e. the correlation, between the corrosion rate of the sacrificial component of the extended waveguide and the corrosion rate of the outer surface of the metal body is determined (e.g. before the use of the system) from laboratory tests of the materials used in the system, e.g. the sacrificial component and the metal body. For example, the mathematical relationship between the corrosion rate of the sacrificial component of the extended waveguide and the corrosion rate of the outer surface of the metal body may have a linear form, e.g. $R_1=KR_2$ where $R_1$ and $R_2$ are the rates of corrosion of the metal body and of the sacrificial component respectively The, e.g. pre-calculated, correlation may be implemented using a lookup table. Preferably the, e.g. pre-calculated, correlation between the corrosion rate of the sacrificial component of the extended waveguide and of the outer surface of the metal body is used to determine the amount of corrosion in the outer surface of the metal body. Thus, once the amount of corrosion of the sacrificial component of the extended waveguide has been determined, the amount of corrosion of the outer surface of the metal body can be determined easily from this.

In a preferred embodiment the corrosion detection system is arranged to detect when the sacrificial component of the extended waveguide comprises a portion having a thickness that has fully corroded. In some embodiments, a detectable change in the impedance of the waveguide may occur when the sacrificial component is fully corroded at a particular location. Thus, preferably in addition to choosing the material of the sacrificial component of the extended waveguide (because the rate of corrosion of the sacrificial component depends on its material), the thickness of the sacrificial component of the extended waveguide is chosen to determine the rate at which the sacrificial component of the extended waveguide fully corrodes, e.g. chosen depending on the material of the outer surface of the metal body, such that the sensitivity of the corrosion detection system may be set, e.g. for a metal body made from a particular material. In a preferred embodiment the sacrificial component of the extended waveguide has a thickness between 5 µm and 2 mm, e.g. between 50 µm and 1 mm, e.g. 0.2 mm. Preferably the thickness of the sacrificial component of the extended waveguide is chosen such that the extended waveguide is flexible.

The extended waveguide (and preferably also the sacrificial component thereof) may be any suitable and desired length. In a preferred embodiment the extended waveguide (and preferably also the sacrificial component thereof) is greater than 10 m in length, e.g. greater than 20 m in length, e.g. greater than 50 m in length, e.g. approximately 100 m in length, though even greater lengths, e.g. up to 1 or 2 km, are also envisaged.

Furthermore, the system may comprise a plurality of extended waveguides, each comprising a sacrificial component and each connected to a waveform generator and a waveform analyser. This allows a much greater length of the outer surface of the metal body, e.g. a greater length of pipework, to be monitored for corrosion.

The extended waveguide (or plurality of extended waveguides) may be arranged relative to the outer surface of the metal body in any suitable and desired way. When the metal body comprises a pipe, the extended waveguide may be arranged to run substantially parallel to the pipe, e.g. in a fixed position relative to the pipe. For a horizontal pipe (and preferably also other non-vertical pipes), preferably the extended waveguide is arranged underneath the pipe. This is a convenient position to monitor the corrosion of the pipe because this is where water may collect, e.g. within the insulation jacket.

In one embodiment, which is particularly suited to monitoring pipework (i.e. when the metal body comprises a metal pipe), the plurality of extended waveguides, each comprising a sacrificial component and each connected to a waveform generator and a waveform analyser, are arranged in series, e.g. to run along the length of one or more pipes.

However, in another embodiment, the plurality of extended waveguides, each comprising a sacrificial component and each connected to a waveform generator and a waveform analyser, are arranged in parallel. This arrangement is suitable for monitoring the corrosion at a plurality of different points around the circumference of a pipe (or, for example, across the surface of a tank). An alternative arrangement, that is particularly suited for when the metal body comprises a metal pipe, is that the extended waveguide is wound in a helix around the circumference of the pipe.

Further combinations of the above topographical arrangements are also considered, e.g. having the plurality of extended waveguides arranged in series and in parallel. This may be in the form of a lattice, which may, e.g., be suitable for monitoring the corrosion over a large surface area, e.g. the wall of a tank. Alternatively it may be in the form of a plurality of parallel extended waveguides that are each connected in series (e.g. multiple times) with a further plurality of parallel extended waveguides, thus allowing, for example, different points around the circumference of a pipe to be monitored for corrosion along a long length of pipework.

The waveform generator may be arranged to generate, and to inject into the extended waveguide, any suitable and desired electromagnetic waveform. The electromagnetic waveform used may depend on the technique used by the waveform analyser to determine the location of the corrosion, e.g. owing to the model or mathematical equations used to determine the location of the corrosion. This is because, looking at it the other way round, the waveform analyser may determine the presence and location of the corrosion depending on the type of electromagnetic waveform injected into the extended waveguide.

In one embodiment the electromagnetic waveform comprises one or more (preferably a plurality of) periodic waveforms, e.g. pulses or sinusoidal waveforms. Preferably the plurality of periodic waveforms are injected into the waveguide one after each other, e.g. as a train of periodic waveforms. The one or more periodic waveforms may each have any suitable and desired characteristics, e.g. one or more of an amplitude, a width, a phase and a frequency (where appropriate). For example, when the periodic waveform comprises a pulse, each pulse is preferably defined by one (or preferably both) of its amplitude and its width. When the periodic waveform comprises a sinusoidal waveform, each sinusoidal waveform is preferably defined by one or more (and preferably all) of its frequency, its amplitude and its phase.

The amplitude, width, phase and/or frequency (when the periodic waveform is defined by one or more of these variables) may take any suitable and desired value. In some embodiments, when the electromagnetic waveform comprises a plurality of periodic waveforms, all of the periodic waveforms may be identical, i.e. the variables by which they are defined all have the same value. In other embodiments, the plurality of periodic waveforms may comprise different periodic waveforms, i.e. the variables by which they are defined have different values.

When the periodic waveform comprises a width, e.g. for a pulse, preferably the width of each of the one or more pulses is between 1 ps and 1000 ps, e.g. between 10 ps and 100 ps.

When the electromagnetic waveform comprises a plurality of periodic waveforms, e.g. a plurality of sinusoidal waveforms, preferably the plurality of periodic waveforms each have different frequencies. Thus preferably the waveform generator is arranged to generate and to inject a plurality of periodic waveforms having a plurality of different frequencies into the waveguide. Injecting a plurality of different frequency periodic waveforms into the waveguide allows the reflected portion of each of the periodic waveforms (when available) to be used to determine the location of the corrosion. This may allow the location of the corrosion to be determined more accurately, as will be described below.

The frequency of the electromagnetic waveform, e.g. of the one or more periodic waveforms (particularly when the periodic waveform comprises a sinusoidal waveform), may be any suitable and desired frequency or frequencies. Preferably the frequency of the periodic waveform or the frequencies that the periodic waveform(s) comprises is between 1 MHz and 20 GHz, e.g. greater than 1 GHz, e.g. greater than 5 GHz, e.g. approximately 10 GHz. (Preferably restricted communication frequencies, e.g. at 900 MHz, 1.8 GHz and 2.4 GHz are avoided.) A higher frequency or frequencies for the periodic waveform helps to reduce (i.e. improve) the resolution that the system is able to locate corrosion of the sacrificial portion of the extended waveguide. For example, a frequency of 1 GHz in a coaxial waveguide provides a resolution of approximately 10 cm, whereas a frequency of 10 GHz gives a 1 cm resolution approximately.

In another embodiment the one or more periodic waveforms are encoded, e.g. shaped. This allows, e.g. the waveform analyser, to correlate the shape of the reflected waveform with the shape of the injected waveform, which may thus enhance the sensitivity of the measurements obtained. In a preferred embodiment the waveform generator is arranged to generate (and inject into the extended waveguide) a train of periodic waveforms, e.g. with the individual waveforms having different frequencies, phases, widths and/or amplitudes (Barker codes may be used, for example).

The corrosion detection system may be arranged to monitor the corrosion of the outer surface of the metal body in any suitable and desired way. The waveform analyser may monitor the corrosion continuously or at discrete times, e.g. separated by an interval. Therefore preferably the waveform generator is arranged to generate (and inject into the extended waveguide) a series of electromagnetic waveforms, e.g. periodic waveforms, either continuously or at discrete times, and the waveform analyser is preferably also arranged to receive and to use the reflected portions of the series of injected electromagnetic waveforms.

The waveform analyser may comprise any suitable and desired type of waveform analyser that is arranged to receive a reflected portion of the injected electromagnetic waveform from the waveguide and to use the reflected portion of the injected electromagnetic waveform to detect the presence of and determine the location of corrosion of the sacrificial component of the waveguide. The waveform analyser may comprise a dedicated device, e.g. an impedance analyser, or the waveform analyser may simply comprise a data acquisition device (DAQ) and a (e.g. computer) processor, which avoids the need for a specialised instrument. In a preferred embodiment the waveform analyser comprises a network analyser, e.g. a vector network analyser.

Although the waveform generator and the waveform analyser may comprise separate components that are both connected to the waveguide (and preferably, in this embodiment, the waveform generator and the waveform analyser are arranged to be connected to the waveguide at substantially the same point of the waveguide, e.g. at one end (e.g. of a section) of the waveguide), in one embodiment the system comprises an integrated waveform generator and analyser that is arranged to perform both the functions of the generator and the analyser. In a preferred embodiment the integrated waveform generator and analyser share a connection to the waveguide, e.g. they are connected to the waveguide by a single connection port or cable. This enables this integrated (single) component to share this single connection with the waveguide through which both the injected electromagnetic waveform is sent and the reflected portion is received.

Preferably the waveform analyser is arranged to detect multiple points of corrosion in the sacrificial component of the extended waveguide, e.g. by receiving and using the reflected portion of the injected electromagnetic waveform that is reflected from a plurality of points of corrosion in the sacrificial component of the extended waveguide. This may be possible because not all of the injected electromagnetic waveform may be reflected by the first point of corrosion it encounters in the sacrificial component of the extended waveguide, i.e. a portion of the injected electromagnetic waveform may be transmitted, such that the transmitted portion may be reflected by one or more further points of corrosion it encounters in the sacrificial component of the extended waveguide. Furthermore, as described above, this may be helped in the embodiment in which the extended waveguide comprises a non-sacrificial component (in addition to the sacrificial component).

In this embodiment, a plurality of reflected portions of the electromagnetic waveform are received by the waveform analyser, corresponding to the plurality of points of corrosion in the sacrificial component of the extended waveguide. The location of each of the plurality of points of corrosion in the sacrificial component of the extended waveguide may then be determined from the time delay of each of the plurality of reflected portions of the electromagnetic waveform (e.g. relative to the injected electromagnetic waveform), using the dielectric constant of the waveguide.

The waveform analyser is arranged to use the reflected portion of the injected electromagnetic waveform to detect the presence and determine the location of corrosion of the sacrificial component of the waveguide in any suitable and desired way. When the electromagnetic waveform comprises a periodic waveform, preferably one or more (and preferably all that are available) of the amplitude, the width, the phase and the frequency of the reflected periodic waveform are used (e.g. by comparing them to the corresponding value(s) of the injected periodic waveform) to determine the location of corrosion of the sacrificial component of the waveguide.

When a plurality of, e.g. different frequency, periodic waveforms are injected into the waveguide, preferably the waveform analyser is arranged to use the reflected portion of each of plurality of injected periodic waveforms to determine the location of corrosion of the sacrificial component of the waveguide.

The waveform analyser may use a lookup table to determine the location of the corrosion, e.g. to relate a determined time delay of a reflected portion to a distance of the cause of the reflection (e.g. corrosion in the waveguide) along the waveguide. When the injected electromagnetic waveform comprises a plurality of periodic waveforms, preferably the group delay (the derivative of the phase of the reflected portions with respect to frequency) is used to determine the location of the corrosion, e.g. using a lookup table of group delay versus distance along the waveguide (e.g. from the location at which the electromagnetic waveform was injected).

In a preferred embodiment the waveform analyser is arranged to use a mathematical model, e.g. perform time or (preferably) frequency domain reflectometry using the reflected portion of the injected electromagnetic waveform to determine the location of corrosion of the sacrificial component of the waveguide. This reflectometry technique is a particularly convenient way to use injected and reflected electromagnetic waveforms to detect changes in impedance in a waveguide.

In another preferred embodiment in which the waveform analyser is arranged to use a mathematical model, the waveform analyser is arranged to perform an inverse Fourier transform on the one or more reflected portions of the electromagnetic waveform to determine the location of the corrosion, e.g. as part of the frequency or time domain reflectometry. This allows the reflected signal to be converted into a time delay and then a distance using the velocity of the electromagnetic waveform in the waveguide as described above. This is particularly convenient when the electromagnetic waveform comprises a plurality of, e.g. different frequency, amplitude and/or phase periodic waveforms, as the inverse Fourier transform may be able to process the reflected portions of the periodic waveforms together. For example, for a periodic waveform having a particular frequency, e.g. in a plurality of periodic waveforms having a plurality of different frequencies, the amplitude and phase of the reflected waveform may be used to determine the location of the corrosion. When the periodic waveform comprises a pulse, preferably the amplitude and width of the reflected waveform is used to determine the location of the corrosion.

In a preferred embodiment the waveform analyser is arranged to perform signal processing on the reflected portion(s) of the electromagnetic waveform, e.g. to detect and discriminate between changes in impedance of the waveguide that are owing to corrosion and changes in impedance that are owing to other reasons, e.g. loose connections (e.g. between the waveguide and the waveform generator and/or analyser).

The waveform analyser may be arranged to perform all the necessary and desired processing using the reflected portion of the electromagnetic waveform to enable the location and the nature of the corrosion of the outer surface of the metal body. For example the waveform analyser may, e.g. perform time or frequency domain reflectometry, to determine a time lapse between the injected and reflected portions of the electromagnetic waveform, then use the time lapse to determine the location of the corrosion, correlate the magnitude of the corrosion of the sacrificial component of the electromagnetic waveguide with the estimated magnitude of the corrosion of the outer surface of the metal body, and performing signal processing using the reflected portion of the electromagnetic waveform to discriminate between corrosion of the sacrificial component of the electromagnetic waveguide and other reasons for changes in impedance, i.e. to allow the location of the corrosion to be identified correctly.

However, in one embodiment, one or more of these steps may be performed by a different component than the waveform analyser. Therefore preferably the system comprises a transmitter arranged to transmit data, e.g. the output of the acquired or analysed data, e.g. from the time or frequency domain reflectometry, from the waveform analyser to allow one or more of these steps to be performed. This allows more complex processing to be performed remotely, thus allowing the waveform analyser simply to receive the reflected portion of the electromagnetic waveform and perform the time or frequency domain reflectometry, thus helping to ensure that only the minimum number of components need to be provided (and installed) in situ. For example, the initial determination of the location of the corrosion may be performed in situ, whereas more in depth processing, e.g. to determine the type of fault in the (e.g. sacrificial component of the) waveguide (e.g. corrosion, moisture, a loose connection, etc.) may be performed onsite, offline or remotely.

The data transmitted from the waveform analyser may be transmitted to any suitable or desired other component, e.g. a computer, using any suitable or desired connection for transmitting the data, e.g. a wired or wireless connection. This allows the condition of the outer surface of the metal body (and indeed a whole collection of metal bodies, e.g. in an installation) to be monitored remotely. The waveform generator may also be arranged to be controlled remotely, e.g. as opposed to being arranged to generate electromagnetic waveforms to be injected either continuously or at regular intervals. This may allow the system, e.g. operated by a controller, to monitor the corrosion of the outer surface of the metal body on demand.

While the invention may only extend to the corrosion detection system per se, the Applicant also envisages that the invention extends to a metal body incorporating a corrosion detection system. Thus when viewed from a further aspect the invention provides a corrosion detection and location system comprising:
 a metal body having an outer surface on which corrosion is to be detected;
 an extended electromagnetic waveguide arranged adjacent to the outer surface of the metal body, the electromagnetic waveguide comprising a sacrificial component that experiences substantially the same environment as the outer surface of the metal body;
 a waveform generator arranged to be connected to the waveguide and to inject an electromagnetic waveform into the waveguide; and
 a waveform analyser connected to the waveguide and arranged to receive a reflected portion of the injected electromagnetic waveform from the waveguide and to use the reflected portion of the injected electromagnetic waveform to determine the location of corrosion of the sacrificial component of the waveguide.

Any or each of the optional and preferable features outlined above are also considered to be applicable to this aspect of the invention. In particular, preferably the metal body comprises a metal pipe and/or preferably the system comprises a layer of insulation covering the outer surface of the metal body.

An embodiment of the invention will now be described, by way of example only, with reference to the accompanying drawing, in which:
 FIG. 1 shows a corrosion detection system in accordance with an embodiment of the present invention;
 FIG. 2 shows a coaxial cable for use in the system shown in FIG. 1;
 FIGS. 3a and 3b shows a further view of the corrosion detection system shown in FIG. 1, with an injected electromagnetic waveform; and
 FIG. 4 shows a graph of injected and reflected electromagnetic waveforms.

A typical oil and gas refinery may contain thousands of kilometres of metal pipework. There metal pipes are typically wrapped in an insulation jacket to insulate the pipe as well as to protect the outer surface of the pipes from corrosion. Although an insulation jacket protects a pipe well from the ingress of water and chlorides, it is difficult to maintain the pipe in a completely sealed environment and so it is inevitable that corrosion will occur.

Owing to the potentially disastrous impact of a leak from a corroded pipe in an oil and gas refinery, it is important that the pipes are monitored for signs of corrosion such that remedial action may be taken before the corrosion advances to a more serious stage. The corrosion detection system of the present invention allows such monitoring of the metal pipes in an oil and gas refinery (or other similar installation) to be performed.

FIG. 1 shows a corrosion detection system 1 in accordance with an embodiment of the present invention. The system 1 includes a metal pipe 2 having a metal outer surface that is covered in an insulation jacket 4. Within the insulation jacket 4, and arranged in close proximity to, but not touching, the outer surface of the metal pipe 2 is a coaxial cable 6. The coaxial cable 6 is arranged to run along the length of the metal pipe 2 and is thus able to monitor the corrosion along this length of the metal pipe 2.

The coaxial cable 6 has a copper core and a copper outer shield, the core and the shield being separated by a dielectric. FIG. 2 shows a coaxial cable 6 for use in the system shown in FIG. 1. Although not shown in FIG. 1, as can be seen in FIG. 2, the coaxial cable 6 is surrounded by a perforated plastic sleeve 14. The perforated sleeve 14 helps to prevent the outer shield of the coaxial cable 6 from coming into contact with the outer surface of the metal pipe 2 and thus inducing corrosion therebetween.

In the corrosion detection system 1 shown in FIG. 1, one end of the coaxial cable 6 is attached to an integral waveform generator and analyser 8. This integral unit 8 includes a waveform generator 10 that is arranged to generate and inject electromagnetic waveforms into the coaxial cable 6, and a waveform analyser 12 that is arranged to receive and analyse reflected portions of the injected electromagnetic waveforms from the coaxial cable 6.

Further views of the corrosion detection system 1 are shown in FIGS. 3a and 3b. FIGS. 3a and 3b show a system 1 in which the metal pipe 2, and thus the coaxial cable 6, has an area of corrosion 16 at a particular location along the metal pipe 2.

FIG. 3a shows the system 1 when an electromagnetic waveform 18 has been injected into the coaxial cable 6, such that it is travelling (from left to right) along the coaxial cable 6 towards the corrosion 16. FIG. 3b shows the system 1 at a later time when the injected electromagnetic waveform 18 has been incident upon the corrosion 16 and a portion 20 of the electromagnetic waveform has been reflected from the location of the corrosion 16 and the remaining portion 22 of the electromagnetic waveform has been transmitted and continues along the coaxial cable 6.

FIG. 4 shows a graph of the injected electromagnetic waveform 18 ("input signal") and the reflected portion 20 of the electromagnetic waveform ("reflected signal from defect"), determined from a simulation of the arrangement shown in FIGS. 3a and 3b.

Operation of the system 1 will now be described with reference to FIGS. 1 to 4.

In operation the coaxial cable 6 (surrounded by a perforated plastic sleeve 14 as shown in FIG. 2) is arranged relative to the metal pipe 2, as shown in FIG. 1, and connected to the integral waveform generator and analyser 8. Over time, the ingress of water and chlorides within the insulation jacket 4 of the metal pipe 2 corrodes the outer surface of the metal pipe 2. As the outer shield of the coaxial cable 6 is exposed to the same environment as the outer surface of the metal pipe 2, i.e. within the insulation jacket 4, the outer shield of the coaxial cable 6 also corrodes.

Periodically, the waveform generator 10 generates and injects an electromagnetic waveform, in the form of a series of predetermined frequency sinusoidal waveforms (typically in the frequency range from 1 MHz to 1 GHz), into the coaxial cable, each sinusoidal wave in the series having a different frequency. A typical injected electromagnetic waveform 18 is shown in FIG. 4.

If any changes in impedance of the coaxial cable 6 are experienced by the sinusoidal waveforms, e.g. owing to corrosion 16 of the sacrificial outer shield of the coaxial cable 6 (as shown in FIGS. 3*a* and 3*b*), this causes a change in the amplitude and phase of a portion of the series of sinusoidal waveforms to be reflected from the point of the change in impedance in the coaxial cable 6, while the remaining portion 22 of the series of sinusoidal waveforms carries along the coaxial cable 6 (i.e. where further changes in impedance may be encountered and thus further reflections generated). A typical reflected portion 20 of the injected electromagnetic waveform is shown in FIG. 4.

The waveform analyser 12 receives these reflected sinusoidal waveforms 20 and performs frequency domain reflectometry on them, specifically taking the inverse Fourier transform of the reflected sinusoidal waveforms, according to the below inverse discrete Fourier transform.

$$h_k = \frac{1}{n}\sum_{i=0}^{n-1} x_i e^{-2j\pi i k/n}$$

where j is the imaginary number ($\sqrt{-1}$) and n is the number of frequency points, i.e. the number of sinusoidal waveforms of different frequency in the injected electromagnetic waveform 18, h is the transformed complex number in the time domain and x is the complex number in the frequency domain ($x = A e^{j\varphi}$, where A is the amplitude of the frequency component and $\varphi$ is the phase).

This enables a time difference between the injected and reflected sinusoidal waveforms 18, 20 to be determined (as shown in FIG. 4 it can be seen this is approximately 5 ns) which is then used, with the dielectric constant of the coaxial cable 6, to calculate the location of the potential corrosion 16. With frequencies of around 1 GHz for the injected series of sinusoidal waveforms, a position resolution of approximately 1 cm can be obtained.

Signal processing of the reflected sinusoidal waveforms 20 enables the ones that are caused by corrosion to be separated from other sources of changes in impedance that also create reflections in the coaxial cable 6, e.g. loose connections between the coaxial cable 6. Furthermore, the corrosion 16 of the outer shield of the coaxial cable 6 may be correlated with corrosion of the outer surface of the metal pipe 2, e.g. depending on the respective materials that they are made from.

With knowledge of the location of the corrosion 16 of the outer shield of the coaxial cable 6, the insulation jacket 4 surrounding the metal pipe 2 can be opened up at this location. This then allows a visual inspection of the outer surface of the metal pipe 2 to be performed and any remedial action, e.g. anti-corrosion treatment, to be performed.

From the above it can be seen that the corrosion detection system 1 of the present invention, installed in, for example, a refinery, can perform monitoring for possible corrosion of the outer surface of the metal pipe 2 which thus obviates the need for speculative visual inspections to be performed. Furthermore, owing to the use of, e.g. frequency domain reflectometry using sinusoidal waveforms with pre-selected frequencies, an accurate determination of the location of the corrosion can be performed over the entire length of the coaxial cable 6. The corrosion detection system 1 of the present invention thus has the potential to drastically improve the detection of the corrosion of the outer surface of metal bodies, as well as simplifying and reducing the cost of such work.

It should be noted that although the particular embodiment described for the corrosion detection system is used to monitor the corrosion of metal pipes, the outer surface of any suitable and desired metal body, e.g. the outer surface of a metal tank, may be monitored using such a system. Furthermore, the metal body may not be covered in a layer of insulation, the metal body may be inaccessible for a different reason, e.g. it is buried or located on the sea bed.

The invention claimed is:

1. A system for detecting and locating corrosion on an outer surface of a metal body, the system comprising:
   an extended electromagnetic waveguide arranged adjacent to the outer surface of the metal body, the extended electromagnetic waveguide comprising a sacrificial component that experiences substantially the same environment as the outer surface of the metal body;
   a waveform generator arranged to be connected to the extended electromagnetic waveguide and to inject an electromagnetic waveform into the waveguide; and
   a waveform analyzer connected to the extended electromagnetic waveguide and arranged to receive a reflected portion of the injected electromagnetic waveform from the extended electromagnetic waveguide and to use the reflected portion of the injected electromagnetic waveform to determine a location of corrosion of the sacrificial component of the extended electromagnetic waveguide.

2. The system as claimed in claim 1, wherein the metal body comprises a metal pipe and the extended electromagnetic waveguide is arranged underneath the metal pipe.

3. The system as claimed in claim 1, wherein the outer surface of the metal body is covered in a layer of insulation, and the extended electromagnetic waveguide is arranged between the outer surface of the metal body and the layer of insulation, or arranged to be embedded within the layer of insulation, such that the sacrificial component of the extended electromagnetic waveguide experiences substantially the same environment as the outer surface of the metal body.

4. The system as claimed in claim 1, wherein the extended electromagnetic waveguide is arranged such that the sacrificial component of the extended electromagnetic waveguide does not contact the outer surface of the metal body.

5. The system as claimed in claim 1, wherein the system comprises a perforated layer that is provided between the extended electromagnetic waveguide and the outer surface of the metal body.

6. The system as claimed in claim 1, wherein the extended electromagnetic waveguide comprises a coaxial waveguide, with the sacrificial component comprising an outer conducting shield of the coaxial waveguide and/or wherein the extended electromagnetic waveguide is flexible.

7. The system as claimed in claim 1, wherein the extended electromagnetic waveguide is arranged such that corrosion of the sacrificial component of the extended electromagnetic waveguide changes an impedance of the extended electromagnetic waveguide.

8. The system as claimed in claim 1, wherein the extended electromagnetic waveguide comprises a material that corrodes at a faster rate than a material forming the outer surface of the metal body.

9. The system as claimed in claim 1, wherein the waveform analyzer is arranged to determine the amount of corrosion to the outer surface of the metal body from the amount of corrosion determined for the sacrificial component of the extended electromagnetic waveguide.

10. The system as claimed in claim 1, wherein the sacrificial component of the extended electromagnetic waveguide has a thickness between 5 µm and 2 mm.

11. The system as claimed in claim 1, wherein the extended electromagnetic waveguide is greater than 10 m in length.

12. The system as claimed in claim 1, wherein the system comprises a plurality of extended electromagnetic waveguides, each comprising a sacrificial component and each connected to a waveform generator and a waveform analyzer.

13. The system as claimed in claim 1, wherein the extended electromagnetic waveform comprises a plurality of periodic waveforms, each periodic waveform having a different frequency.

14. The system as claimed in claim 13, wherein each periodic waveform of the plurality of periodic waveforms has a width between 1 and 1000 ps and/or wherein each periodic waveform of the plurality of periodic waveforms is encoded.

15. The system as claimed in claim 1, wherein the extended electromagnetic waveform comprises a frequency between 1 MHz and 20 GHz.

16. The system as claimed in claim 1, wherein the system comprises an integrated waveform generator and waveform analyzer that is arranged to perform both the functions of the waveform generator and the waveform analyzer.

17. The system as claimed in claim 1, comprising at least one of the following features (a) to (c): (a) the waveform analyzer is arranged to detect multiple points of corrosion in the sacrificial component of the extended electromagnetic waveguide, (b) the waveform analyzer is arranged to perform time or frequency domain reflectometry using the reflected portion of the injected electromagnetic waveform to determine the location of corrosion of the sacrificial component of the extended electromagnetic waveguide, or (c) the waveform analyzer is arranged to perform an inverse Fourier transform on the reflected portion of the extended electromagnetic waveform.

18. The system as claimed in claim 1, wherein the system comprises a transmitter arranged to transmit output data from the waveform analyzer.

19. A corrosion detection and location system comprising:
- a metal body having an outer surface on which corrosion is to be detected;
- an extended electromagnetic waveguide arranged adjacent to the outer surface of the metal body, the extended electromagnetic waveguide comprising a sacrificial component that experiences substantially the same environment as the outer surface of the metal body;
- a waveform generator arranged to be connected to the extended electromagnetic waveguide and to inject an electromagnetic waveform into the extended electromagnetic waveguide; and
- a waveform analyzer connected to the extended electromagnetic waveguide and arranged to receive a reflected portion of the injected electromagnetic waveform from the extended electromagnetic waveguide and to use the reflected portion of the injected electromagnetic waveform to determine a location of corrosion of the sacrificial component of the extended electromagnetic waveguide.

* * * * *